No. 648,314. Patented Apr. 24, 1900.
I. B. ULLOM.
CORN PLANTER.
(Application filed Jan. 16, 1900.)
(No Model.)
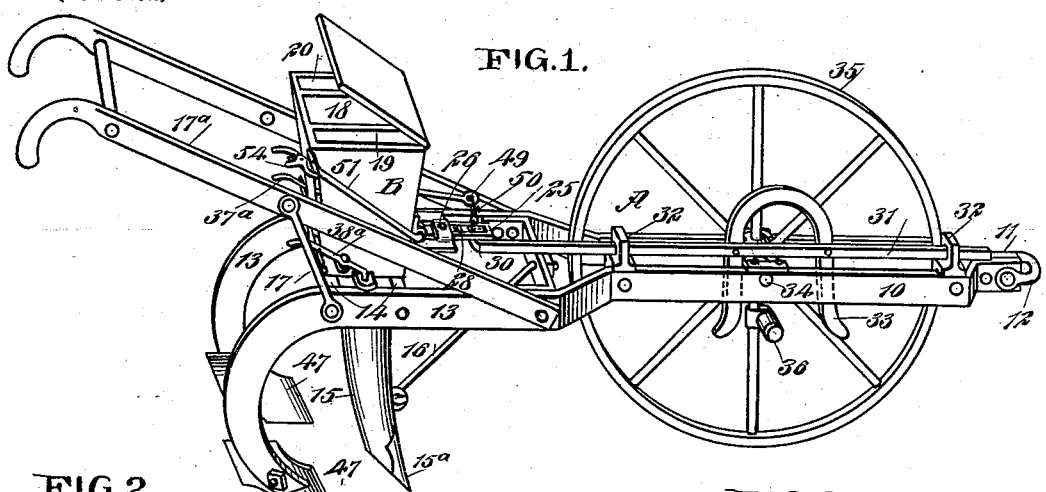
FIG. 1.
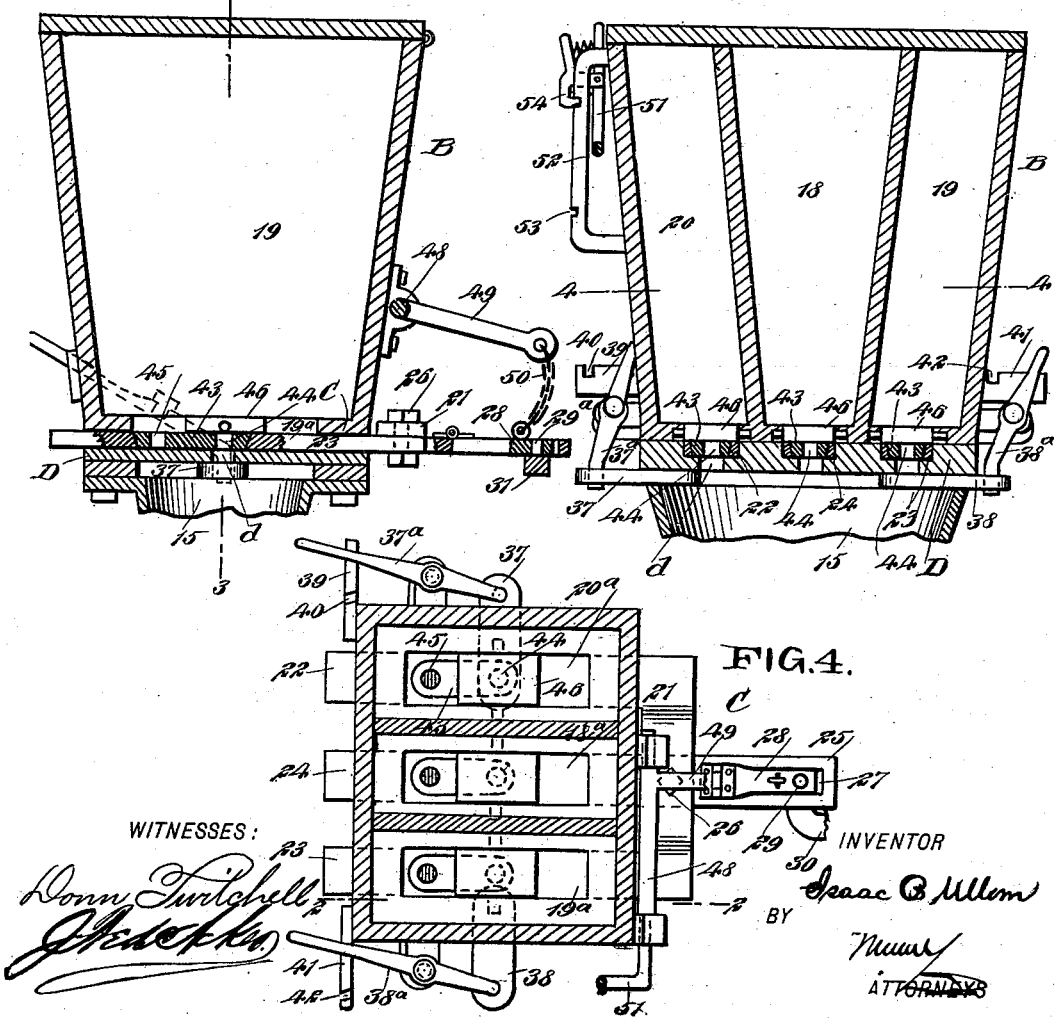
FIG. 2.
FIG. 3.
FIG. 4.
WITNESSES:
INVENTOR
Isaac B. Ullom
BY
ATTORNEYS
THE NORRIS PETERS CO., PHOTO-LITHO., WASHINGTON, D. C.

UNITED STATES PATENT OFFICE.

ISAAC B. ULLOM, OF CLAYSVILLE, PENNSYLVANIA.

CORN-PLANTER.

SPECIFICATION forming part of Letters Patent No. 648,314, dated April 24, 1900.

Application filed January 16, 1900. Serial No. 1,634. (No model.)

*To all whom it may concern:*

Be it known that I, ISAAC B. ULLOM, a citizen of the United States, residing at Claysville, in the county of Washington and State of Pennsylvania, have invented a new and useful Improvement in Corn-Planters, of which the following is a full, clear, and exact description.

One object of my invention is to provide a planter through the medium of which corn or other seed and pumpkin-seed and fertilizer may be simultaneously discharged from the seedbox and whereby any of the articles above enumerated may be independently and singly discharged or whereby any desired combination can be effected.

A further object of the invention is to provide a very simple device for accomplishing the above result and means for regulating the outlets of the seedbox, which seedbox is provided with various compartments, each compartment having an independent outlet.

Another object of the invention is to provide a ready means for throwing the actuating mechanism of the drop-slide out of gear with said slide.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved implement. Fig. 2 is a central vertical section on the line 2 2 in Fig. 4 through the seedbox and drop-slide, the seedbox being drawn on a larger scale than shown in Fig. 1. Fig. 3 is a section taken at right angles to the section shown in Fig. 2 and on the line 3 3 in Fig. 2, and Fig. 4 is a horizontal section taken practically on the line 4 4 in Fig. 3.

The frame of the machine consists of a forward loop-section comprising two side bars 10, properly spaced and connected centrally at their forward portions by extensions 11, to which the clevis 12 is attached, and beams 13 extend rearward from the side bars 10 of the forward loop-sections in opposite directions. Each beam 13 is downwardly and forwardly curved. The beams are connected by crossbars 14, as shown in Fig. 1, and on these crossbars the seedbox is supported. The seedbox is provided with the usual furrow-opening drill 15, having, preferably, a steel point $15^a$, as shown in Fig. 1, and this drill is braced to the cross-bar of the frame by a brace-rod 16 or its equivalent. Other brace-rods 17 extend from the beams 13 and connect with handles $17^a$, which are secured to the forward portions of the beam-sections 13 of the frame. The seedbox is preferably divided by suitable partitions into three compartments—namely, a central compartment 18, adapted to contain corn, and two side compartments 19 and 20, one of which side compartments may contain a fertilizing material and the other side compartment pumpkin-seed or beans, as may be required, so that corn and pumpkin-seed or beans may be simultaneously planted and fertilizer distributed to the hills. As will be hereinafter set forth, the corn may be planted alone and the fertilizing material and the auxiliary seed may be dropped whenever desired.

The bottom of the seedbox B is provided with three openings—a central opening $18^a$ and side openings $19^a$ and $20^a$—and the seedbox is so supported on the drill 15 that a seed-drop slide may operate readily with a forward-and-backward movement immediately beneath the openings in the bottom of the seedbox. This seed-drop slide C consists of a forward member 21, located at the forward portion of the seedbox, and side members 22 and 23, one of which has movement below the opening $20^a$ in the bottom of the seedbox and the other has movement below the opening $19^a$ in said box. The third and independent member 24 is mounted to slide beneath the central opening $18^a$ in the seedbox beneath the main seed-drop slide, and this central member 24 may be attached to the main slide by means of a screw or a bolt 26, so that all three members may be moved simultaneously; but when the bolt or screw 26 is removed the main slide remains idle, while the central slide 24 only operates. The central slide 24 is provided with a forward extension 25, and this extension is provided with a longitudinal slot 27, in which a plate 28 is adapted to fit, said plate being hinged to the extension 25 of the central member of the drop-slide at the rear of the slot 27 therein, as shown in Fig. 4. The forward portion of the plate 28 is provided with an opening 29, which is adapted to receive a pin 29ª, extending upward from the upturned rear end 30 of an actuating-bar 31, which actuating-bar is held to slide in guides 32, carried by the loop-section of the frame A, and an inverted-U-shaped directing-rod 33 is secured to the actuating-rod 31, and the members of the directing-rod extend downwardly at each side of the axle 34, journaled in the loop-section of the frame, upon which the forward supporting-wheel 35 of the implement is secured or is mounted to turn, the said supporting-wheel being within the forward or loop section of the frame, as shown in Fig. 1. A trip-pin 36 is secured to one of the spokes of the supporting-wheel 35, which pin by alternate engagement with the members of the directing-rod 33 reciprocates or imparts end movement to the actuating-rod 31. In this manner it will be observed that a forward-and-backward reciprocating movement is imparted to the seed-drop slide C. Preferably the members of the seed-drop slide C are mounted to slide in grooves produced in an auxiliary bottom D, as shown in Figs. 2 and 3. This auxiliary bottom has openings therein communicating with the drill and adapted to register with the pockets in the members of the slide, which are adapted to discharge material.

A cut-off slide 37 is located at one side of the seedbox below the seed-drop slide, and this cut-off slide when in its inner or normal position, as shown in Fig. 4, is adapted to prevent any material contained in the compartment 20 from escaping therefrom, no matter whether the entire drop-slide C is in operation or not, and this cut-off 37 is connected with a lever 37ª, fulcrumed at the outer side of the seedbox, the handle of the lever being adapted to enter suitable notches or recesses 40 in an extension 39 from the rear portion of the seedbox. A similiar cut-off 38 is provided for the side compartment 19, the cut-off 38 being attached to a lever 38ª, which lever enters notches or recesses 42 in a projection 41 from the rear of the seedbox, as shown in Figs. 3 and 4.

Sometimes it is desirable that more or less seed should be dropped than at other times, and to that end in each of the members of the drop-slide C, which extend below the openings 18ª, 19ª, and 20ª in the seedbox, a longitudinal slot is produced in which a bushing 43 is introduced, and each bushing is provided with an opening 44 near one end and with an opening 45 near the opposite end, and in the different bushings the openings 44 and 45 are of different capacity. Immediately above each of the bushings 43 a scraper or guide-plate 46 is preferably pivoted in the openings 18ª, 19ª, and 20ª, the said scrapers 46 being adapted to remove surplus material from the openings in the bushings of the drop-slide and likewise prevent any more material entering the openings than is necessary. When the seed-drop slide moves forwardly, the seed is received in the openings 45 of the bushings of the slide and is carried beneath the scrapers 46 and deposited in a suitable trough, which leads to the drill 15, and at the rearward movement of the seed-drop slide the forward openings 44 of the bushings 43 receive the seed and conduct the same to the drill.

As heretofore stated, when the central member 24 of the seed-drop slide is disconnected from the main portion of the slide this part only is operated automatically and corn only is dropped; but when the three members of the seed-drop slide are connected the cut-offs 37 and 38 may be brought in position to prevent any material escaping from the side compartments of the seedbox, and whenever it is desired to deposit a fertilizing material or to drop pumpkin or other auxiliary seed it is simply necessary for the operator to open either one or the other of the cut-offs 37 and 38 by manipulating their levers 37ª and 38ª. Both of these cut-offs may be held open during the operation of the machine or either one of them, as may be desired.

Covering-blades 47 are attached to the lower portions of the beams 13 of the frame. These covering-blades may be turned end for end and are so twisted or curved that they incline outwardly in opposite directions and tend to throw the earth into the furrow made by the point of the drill, and thus cover the seed.

When it is desired to stop the operation of the machine, it is simply necessary to disconnect the plate 28 from the actuating-bar 31, and this is readily accomplished by lifting said bar 28. Such lifting action is ordinarily brought about through the medium of a shaft 48, usually journaled at the front of the seedbox B, which shaft is provided with a crank-arm 49 at its inner end, connected by a chain 50 with the plate 28, and the shaft 48 is provided at its outer end with a second crank-arm 51, which extends upward and is held to slide within a keeper 52, (shown in Figs. 1 and 3,) and this keeper is provided with notches 53, adapted to receive a thumb-latch 54, carried by the outer crank arm or handle 51 of the shaft 48. The two notches 53 are provided in the keeper in order that the handle of the shaft 48 may be locked in two positions, the upper position serving to hold the plate 28 at an angle to the seed-drop slide, while when the thumb-latch 54 is in the lower notch 53 the plate may remain seated in the extension of the seed-drop slide and in engagement with the actuating-bar 31.

Having thus described my invention, I claim as new and desire to secure by Letters Patent—

1. In a planter, the combination, with a frame terminating in beams, said beams being provided with covering-blades extending outwardly in opposite directions, a supporting-wheel for the forward section of the frame, an actuating-bar held to slide in the forward portion of the frame and provided with an inverted-U-shaped directing-bar, a projection from a spoke of the supporting-wheel, arranged for engagement with the members of the directing-bar, and a drill carried by the rear portion of the frame, of a seedbox mounted over the said drill, which box is provided with a series of compartments, each having an independent outlet, and cut-offs for the outlets of the side compartments, means for operating said cut-offs, a seed-drop slide having a member for each of the compartments, the drop-slide being arranged to operate between the bottom of the seedbox and the cut-offs, the side members of the seed-drop slide being connected and the central member having a detachable engagement with the connected side members, an extension from the central member of the seed-drop slide, a plate having a hinged connection with the said extension and arranged for engagement with the actuating-bar, and means for raising and lowering said plate, as described.

2. In a planter, a frame terminating in beams, covering-blades carried by said beams, a seedbox mounted on the frame and provided with a series of compartments each having an independent outlet, cut-offs for the outlets of the side compartments, means for operating said cut-offs, a seed-drop slide having a member for each of the compartments, the drop-slide being arranged to operate between the bottom of the said members and the cut-offs, the side members of the seed-drop slide being connected and the central member having a detachable engagement with the connected side members, an extension from the central member of the seed-drop slide, a plate having a hinged connection with the said extension, and an actuating-bar arranged for engagement with the said plate.

In testimony whereof I have signed my name to this specification in the presence of two subscribing witnesses.

ISAAC B. ULLOM.

Witnesses:
J. L. NAHAR,
J. W. CLUTTER.